Patented Nov. 28, 1933

1,937,269

UNITED STATES PATENT OFFICE 1,937,269

PROCESS FOR THE PRODUCTION OF ALKYL HALIDES

Paul Ernst, Burghausen, Germany, assignor to Dr. Alexander Wacker Gesellschaft fur Elektrochemische Industrie, Munich, Bavaria, Germany, a corporation No Drawing. Application April 14, 1930, Serial No. 444,361, and in Germany August 9, 1929

8 Claims. (Cl. 260—166)

This invention relates to a process for the production of alkyl halides and more particularly to a process in which alcohols and hydrogen chloride are reacted in gaseous form in the presence of a catalyst.

Heretofore alkyl chlorides have been produced by reacting an alcohol and hydrochloric acid in gaseous form in the presence of such catalysts as wood charcoal, infusorial earth and various other catalysts prepared by special processes to give activated surfaces. Such catalysts have not proven satisfactory as they are not particularly efficacious, quickly lose their catalytic action and, furthermore, only are effective at high reaction temperatures which cause various side reactions thereby reducing the yield of alkyl chloride.

This invention resides in the discovery that phosphoric acid or substances capable of producing phosphoric acid at elevated temperatures are excellent catalysts for the production of alkyl chlorides by the reaction of alcohols and hydrochloric acid in gaseous state. Phosphoric acid is a particularly effective, long lasting catalyst and enables the reaction to proceed at below 220° C., thereby practically eliminating completely the wasteful side reactions so detrimental to processes heretofore used.

Another advantageous property of phosphoric acid as a catalyst is its pronounced insensitivity to water vapor and other catalyst poisons encountered in this type of process.

Although the phosphoric acid may be used as a catalyst without a carrier, it is preferable to saturate some porous carrier as wood charcoal, bone black, etc., with phosphoric acid and use the resulting material as the catalyst. It is not necessary to use specially processed highly activated carbon for this process but such a carrier may be used if desired.

Phosphoric acid alone has a tendency to attack the reaction chamber but this tendency is eliminated by supporting it on a carrier. Furthermore, the activity of the phosphoric acid as a catalyst is increased when supported on a carrier.

The reaction is best carried out between approximately 170°-220° C.

The use of phosphoric acid as a catalyst in these processes should not be confused with the use of specially prepared highly activated carbon which is treated with phosphoric acid in the activating process. The phosphoric acid used to treat the carbon in such processes is completely washed out and not present at all in the finished catalyst.

In my process it is preferred to lead a stoichiometric mixture of an alcohol vapor and hydrochloric acid gas through a tube heated to 170°-220° C. filled with bone black carrying phosphoric acid. The yield is substantially equal to the theoretical yield in every case.

Among the alcohols which can be used in this process are ethyl, butyl, propyl, and amyl alcohol.

To illustrate the invention specifically the following examples are given, but it is to be understood that the invention is not limited to these examples:

Example I.—A stoichiometric gaseous mixture of ethyl alcohol and hydrogen chloride is led through liquid phosphoric acid at 180°-200° C. and the ethyl chloride formed is suitably condensed. The yield of ethyl chloride is practically quantitative.

Example II.—A stoichiometric mixture of ethyl alcohol and hydrogen chloride in vapor form is led at a temperature of 170°-220° C. over wood charcoal saturated with phosphoric acid. Quantitative yield of ethyl chloride is obtained on suitable condensation.

Example III.—A dilute aqueous ethyl alcohol solution is saturated with hydrochloric acid to such an extent that a mol of hydrogen chloride is dissolved to every mol of alcohol present. This mixture is completely vaporized and the vapor is led through a tube filled with coke containing phosphorus at 180°-220° C. whereupon ethyl chloride is obtained almost quantitatively.

Example IV.—A gaseous mixture of normal butyl alcohol and hydrogen chloride is led at 180°-220° C. over bone black saturated with phosphoric acid. Upon suitable condensation of the resulting gas, normal and secondary butyl chlorides are obtained in quantitative amounts.

In the above examples the space velocity of the reacting gas may range from 1 to 500, depending somewhat on other conditions under which the process is carried out. By the term "space velocity" is meant the number of volumes of reacting gases passing through one volume of catalyst per hour.

The invention claimed is:

1. Process for the production of alkyl chlorides comprising reacting a gaseous mixture of an alcohol and hydrogen chloride in substantially stoichiometric proportions at a temperature between 170°-220° C. in the presence of phosphoric acid as a catalyst.

2. Process for the production of ethyl chloride comprising reacting ethyl alcohol vapor and hydrogen chloride gas in substantially stoichiometric proportions at a temperature between 170°–220° C. in the presence of phosphoric acid as a catalyst.

3. Process for the production of alkyl chlorides comprising passing a gaseous mixture of an alcohol and hydrogen chloride at between 170°–220° C. over a phosphoric acid catalyst.

4. Process for the production of alkyl chlorides comprising passing a gaseous mixture of an alcohol and hydrogen chloride at between 170°–220° C. over a phosphoric acid catalyst on a porous material.

5. Process for the production of alkyl chlorides comprising passing a gaseous mixture of an alcohol and hydrogen chloride at between 170°–220° C. over a phosphoric acid catalyst on a porous material, said porous material being selected from the group consisting of pumice, bone black, coke, and wood charcoal.

6. Process for the production of ethyl chloride comprising passing a gaseous mixture of butyl alcohol vapor and hydrogen chloride at a temperature between 180°–220° C. over a phosphoric acid catalyst on a porous material.

7. Process for the production of alkyl chlorides comprising passing a gaseous mixture of an alcohol and hydrogen chloride in substantially stoichiometric proportions at a temperature between 170°–220° C. over a phosphoric acid catalyst on a porous material.

8. Process for the production of ethyl chloride comprising passing a mixture of ethyl alcohol vapor and hydrogen chloride gas in substantially stoichiometric proportions at a temperature of 170°–220° C. over a phosphoric acid catalyst on a porous material.

PAUL ERNST.